(12) United States Patent
Briggs, IV et al.

(10) Patent No.: US 10,399,704 B2
(45) Date of Patent: Sep. 3, 2019

(54) REACTIVE TETHER SPOOL

(71) Applicant: Blue Vigil, LLC, Harrisonburg, VA (US)

(72) Inventors: Fred Melvelle Briggs, IV, Ashburn, VA (US); Todd Stave, Rockville, MD (US)

( * ) Notice: Subject to any disclaimer, the term of this patent is extended or adjusted under 35 U.S.C. 154(b) by 344 days.

(21) Appl. No.: 15/456,096

(22) Filed: Mar. 10, 2017

(65) Prior Publication Data
US 2017/0259941 A1 Sep. 14, 2017

Related U.S. Application Data

(60) Provisional application No. 62/306,154, filed on Mar. 10, 2016.

(51) Int. Cl.
| G05D 1/00 | (2006.01) |
| B64F 3/02 | (2006.01) |
| B66D 1/12 | (2006.01) |
| B66D 1/50 | (2006.01) |
| B64C 39/02 | (2006.01) |

(52) U.S. Cl.
CPC .............. *B64F 3/02* (2013.01); *B64C 39/022* (2013.01); *B64C 39/024* (2013.01); *B66D 1/12* (2013.01); *B66D 1/505* (2013.01); *B64C 2201/148* (2013.01); *B66D 2700/0191* (2013.01)

(58) Field of Classification Search
CPC ....... B64F 3/02; B64C 39/022; B64C 39/024; B64C 2201/148; B66D 1/505; B66D 1/12; B66D 2700/0191; B60R 25/00; G07C 5/008; G07C 9/00309; G07C 2009/00793
USPC .......................... 701/2; 212/257; 258/1.2, 1.8
See application file for complete search history.

(56) References Cited

U.S. PATENT DOCUMENTS

| 8,991,793 | B1 * | 3/2015 | Bernhardt | B64D 37/32 |
| | | | | 258/1.2 |
| 9,174,733 | B1 * | 11/2015 | Burgess | B64D 1/12 |
| 9,688,404 | B1 * | 6/2017 | Buchmueller | B64D 1/12 |
| 9,817,396 | B1 * | 11/2017 | Takayama | G05D 1/0038 |
| 2011/0180667 | A1 * | 7/2011 | O'Brien | B64C 39/022 |
| | | | | 244/135 R |
| 2013/0307274 | A1 * | 11/2013 | Sia | F03D 5/00 |
| | | | | 290/55 |
| 2016/0152345 | A1 * | 6/2016 | Molnar | B64C 39/024 |
| | | | | 244/39 |
| 2017/0023947 | A1 * | 1/2017 | McMillion | B64D 1/22 |

* cited by examiner

*Primary Examiner* — Shardul D Patel
(74) *Attorney, Agent, or Firm* — David Grossman (57) ABSTRACT

A reactive tether spool comprises a drum, a signal cable, a drum actuator, a tension sensor, and a controller. The signal cable transports power and a control signal to a UAV. A controller receives a tension measurement from the tension sensor and controls the drum actuator to maintain a determined tension on the signal cable while performing at least one of the following: dispensing the signal cable; holding the signal cable steady; and collecting the signal cable.

20 Claims, 8 Drawing Sheets

REACTIVE TETHER SPOOL

CROSS-REFERENCE TO RELATED APPLICATIONS

This application claims the benefit of U.S. Provisional Application No. 62/306,154, filed Mar. 10, 2016, which is hereby incorporated by reference in its entirety.

BRIEF DESCRIPTION OF THE SEVERAL VIEWS OF THE DRAWINGS

Example

Example

Example

Example

Example

Example

Example

Example

DETAILED DESCRIPTION OF EMBODIMENTS

Embodiments of the present invention comprise a reactive spool for providing power to an Unmanned Aerial Vehicle (UAV) via a signal tether. Some of the various embodiments also provide communication capabilities between a ground controller and the UAV via the signal tether.

Figure 1:
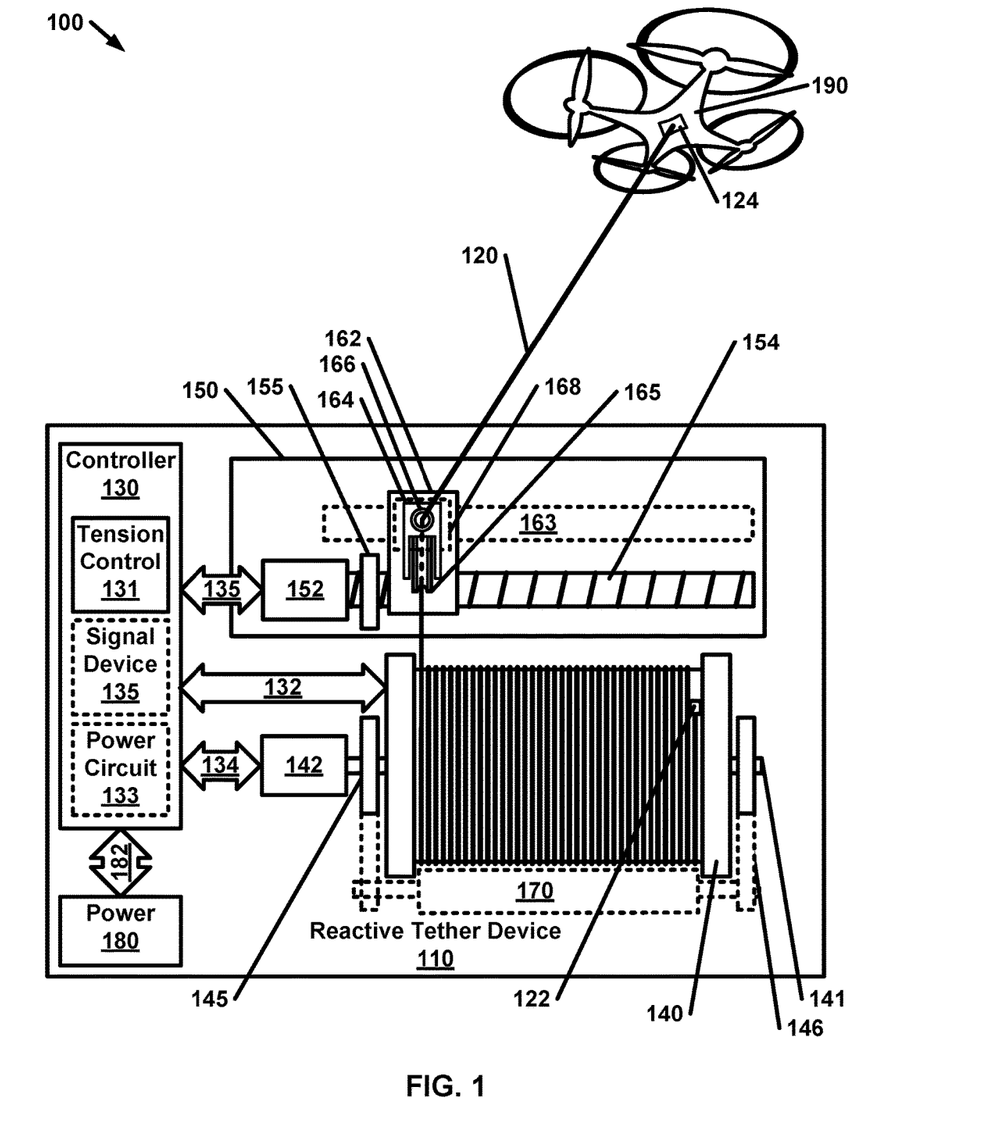
FIG. 1 is a diagram of a reactive spool as per an aspect of an embodiment of the present invention.

FIG. 1 is an example diagram of a system 100 with a reactive tether device 110 connected to a UAV 190 via a tether 120 as per an aspect of an embodiment of the present invention. The reactive tether device 110 comprises a carriage 145, a drum 140, a drum connector 122, a signal cable 120, a drum actuator 142, a cable drum feed 150, a UAV feed 166, a tension sensor 168, and a controller 130.

Drum 140 may be configured as a spool to hold sections of the signal cable 120. As the drum 140 rotates, more or less of the signal cable 120 may be added to or removed from the drum 140.

The drum 140 may be rotatably mounted on carriage 145 employing, for example axel 141. The carriage 145 may be constructed by at least two blocks disposed on a base. Alternatively, the carriage be cast, molded, formed and/or the like to contain the drum 140. The carriage may comprise bearings to enable the drum 140 to rotate.

The drum connector 122 may be disposed on the drum 140. The drum connector 122 may be electrically connected to a power source 180. The power source may be internal to the drum 140 or external to the drum 140. When the power source is external to the drum 140, the connection to external power source 180 may comprise a signal conduit 132 to a power circuit 133. As used in this disclosure, the term conduit means a mechanism configured for the communication of information, such as without limitation a wired communications channel, a wireless communications channel, a combination thereof, and/or the like. The power circuit 133 may provide switching functions, voltage regulation, current regulation, power factor adjustments, power overload controls, combinations thereof and/or the like. Because the drum 140 may be rotatable, at least part of the electrical connection to conduit 132 may be via a slip ring mechanism, electrical brushes, induction, combinations thereof, and/or the like.

The drum connector 122 may be electrically connected to controller 130 and/or signal device 135. The signal device 135 may be internal to the drum 140 or external to the drum 140. When signal device 135 is external to the drum 140, the connection to signal device 135 may comprise signal conduit 132. The signal device 135 may receive and/or transmit various signals to UAV 190 via signal cable 120. Example of signals comprise, but are not limited to UAV control signals, communication signals, video signals, audio signals, transducer signals, sensor signals, combinations thereof, and/or the like. According to some of the various embodiments, signal device 135 may comprise a UAV controller. According to other embodiments, signal device 135 may comprise a communications device. In yet other embodiments, signal device 135 may comprise both a UAV controller and a communications device.

The signal cable 120 may be configured to transport power. According to various embodiments, the signal cable 120 may also be configured to transport communications and/or control signals. A first end of the signal cable 120 may be configured to connect with the drum connector 122. The connection to the drum connector 122 may be, for example, hard wired. According to one alternative, the connection to the drum connector 122 may be, for example, via an electromechanical connector.

A second end of the signal cable 120 may comprise a UAV connector 124. The UAV connector 124 may be configured to connect with a UAV 190. The UAV connector 124 may comprise an electromechanical connector, a mechanical connector, and electrical connector, combinations thereof, and/or the like. According to some of the various embodiments, the power and/or signals may be provided to UAV 190 directly via the UAV connector. In yet other embodiments, the UAV connector 124 provide a mechanical connection to signal cable 120 and the power and/or signals may be provided to UAV 190 via a wireless mechanism such as, for example, induction, electromagnetic radiation, combinations thereof, and/or the like.

The signal cable 120 may comprise a breaking strength in excess of the expected pressure exerted by a UAV 190 in flight. For example, signal cable 120 may comprise a breaking strength in excess 10 pounds. Signal cable may comprise at least one of the following: an electrical cord, an optical cable, a coaxial cable, combinations thereof, and/or the like.

The drum actuator 142 may be configured to rotate the drum 140. Drum actuator 142 may comprise, for example, a stepper motor, a servo motor, a solenoid, a switch, a clutch, a transmission, a combination thereof, and/or the like. The drum actuator 142 may also comprise sensor feedback. The drum actuator 142 may receive commands from controller 130 via communications conduit 134. In alternative embodiments, without limitation, drum actuator 142 may comprise its own controller. In yet other embodiments, without limitation, drum actuator 142 may comprise its own controller and a conduit 134 to external controller 130.

The cable drum feed 150 may be configured to align the signal cable 120 to the drum 140. The cable drum feed 150 may comprise an actuator such as, for example, a linear actuator and/or a tether spooling pulley 165.

A linear actuator is a mechanical device used to move items through a system and may use energy to develop force and motion in a linear manner—that is push and pull movements. The linear actuator may comprise a lead screw 154, a support 155, a lead screw actuator 152, a movement block 162, and an optional guide bar 163. The lead screw 154 may be rotated by lead screw actuator 152. Lead screw actuator 152 may be controlled by an internal controller and/or an external controller 130. Controller 130 may communicate to lead screw 154 via conduit 135. Lead screw 154 may be supported by a support structure such as support block 155. The movement block 162 may be in contact with the lead screw such that rotations of the lead screw 154 cause the movement block 162 to move in a linear direction. The movement block may be supported by an additional support such as: optional guide bar 163, wheels, slides, combinations thereof, and/or the like.

The presently described linear actuator is only presented as an example. It is envisioned that other actuators know to those skilled in the art may be employed. Examples of alternative actuators may comprise rod type actuators, rodless type actuators, electrical actuators, electro-hydraulic actuators, hydraulic actuators, pneumatic actuators, combinations thereof, and/or the like.

The UAV feed 166 may be configured to align the signal cable 120 as it exits the reactive tether device 110 towards the UAV 190. The UAV feed 166 may be a mechanical guide, a channel, a pulley a combination thereof, and/or the like.

The tether spooling pulley 165 may act as an alignment pulley configured to align the signal cable 120 between the drum 140 and the UAV feed 166. Tether spooling pulley 165 may be connected to the linear actuator via, for example, spooling block 162 so that the signal cable 120 is fed to and from drum 140 in a relatively perpendicular orientation.

Tension sensor 168 may be configured to measure the tension of the signal cable 120. As illustrated in FIG. 1, a tension sensor 168 may be configured to measure the force exerted by the signal cable 120 on pulley 165 attached to movement block 162.

The controller 130 may comprise at least one processor and a tangible medium that is not a transitory propagating signal. The medium may comprise instructions configured to cause the at least one processor to: receive a tension measurement from the tension sensor 168 and control the first actuator 142 to maintain a determined tension on the signal cable 120 while performing at least one of the following: dispensing the signal cable 120, holding the signal cable 120 steady, collecting the signal cable 120, and/or the like. Controller 130 may also comprise a tension control module 131, a signal device 135, a power circuit 133, combinations thereof, and/or the like.

The reactive tether device 110 may also comprise an optional roller 170 configured to apply pressure to signal cable 120 wound on drum 140. As drum 140 is rotated, the optional roller 170 may be configured to apply a degree of pressure to keep the signal cable 120 adjacent to the drum 140 without hampering the ability of the drum 140 to rotate and/or damaging the signal cable 120. The optional roller 170 may be rotatably mounted on carriage 146. The carriage 146 may be constructed by at least two blocks disposed on a base. Alternatively, the carriage be cast, molded, formed and/or the like to contain the optional roller 170. The carriage may comprise bearings to enable the optional roller 170 to rotate. Carriage 146 may be an extension of carriage 145.

Figure 2:
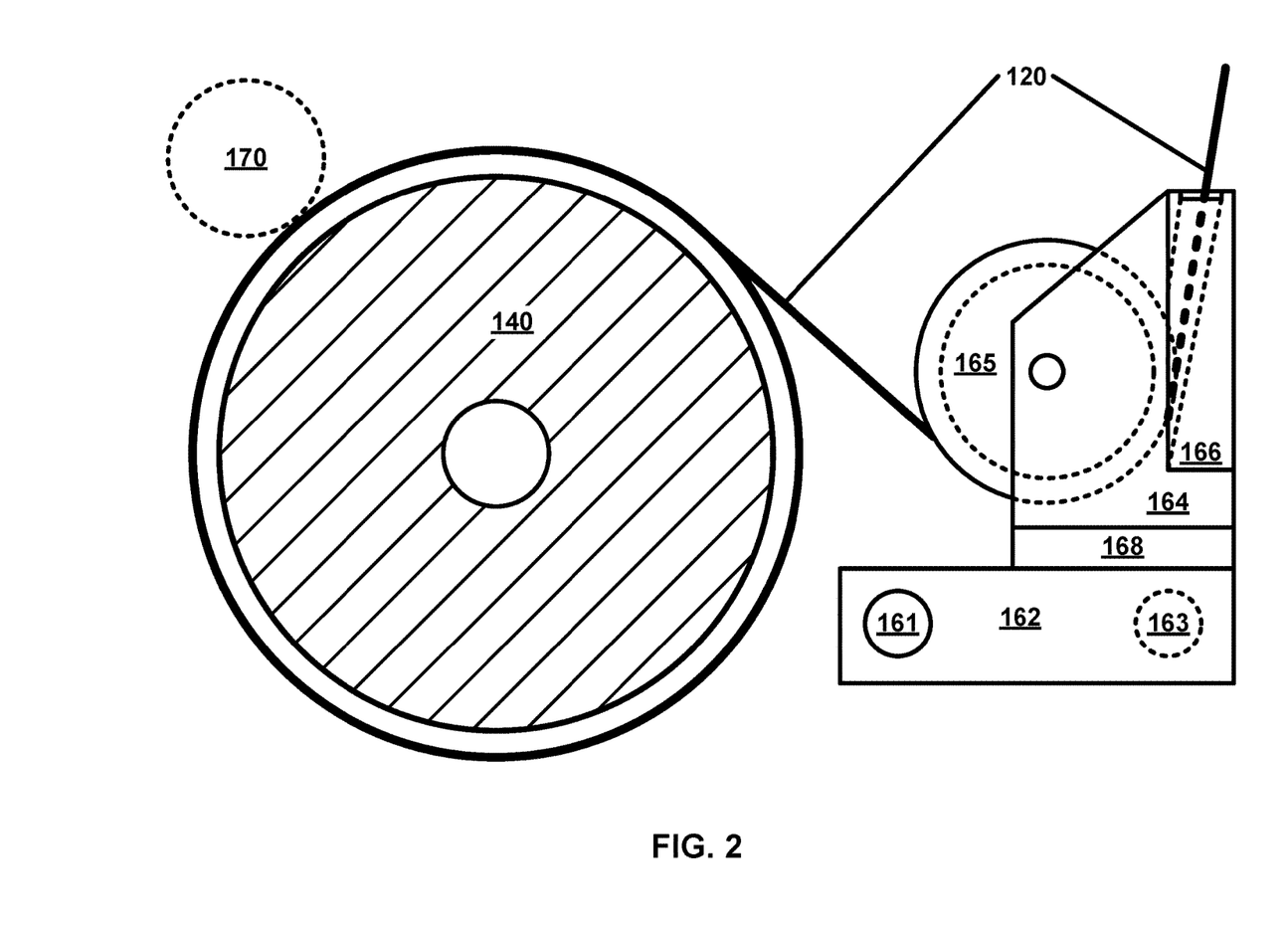
FIG. 2 is a side view of a spool feed mechanism as per an aspect of an embodiment of the present invention.

Example FIG. 2 is a side view of a spool feed mechanism as per an aspect of an embodiment of the present invention. As illustrated, signal cable 120 may be wound on drum 140. Optional roller 170 may apply pressure to keep signal cable 120 from getting tangled when being wound or unwound from drum 140. Signal cable 120 may be directed from drum 140 to UAV 190 via pulley 165 and UAV feed 166. Movement block 162 may be guided linearly across drum 140 on optional rail 163 by lead screw 161. According to optional embodiments, other actuators may be employed to move the movement block 162. A pulley support 164 may hold pulley 165 in position. Tension sensor 168 may be disposed between pulley support 164 and movement block 162. Tension on signal cable 120 threaded around pulley 165 may apply a measurable force on tension sensor 168. Tension sensor 168 may comprise at least one of the following: a load cell, a strain gage transducer, a tension sensing roller, a piezo electric crystal, an angle sensor, a combination thereof, and/or the like.

Figure 3:
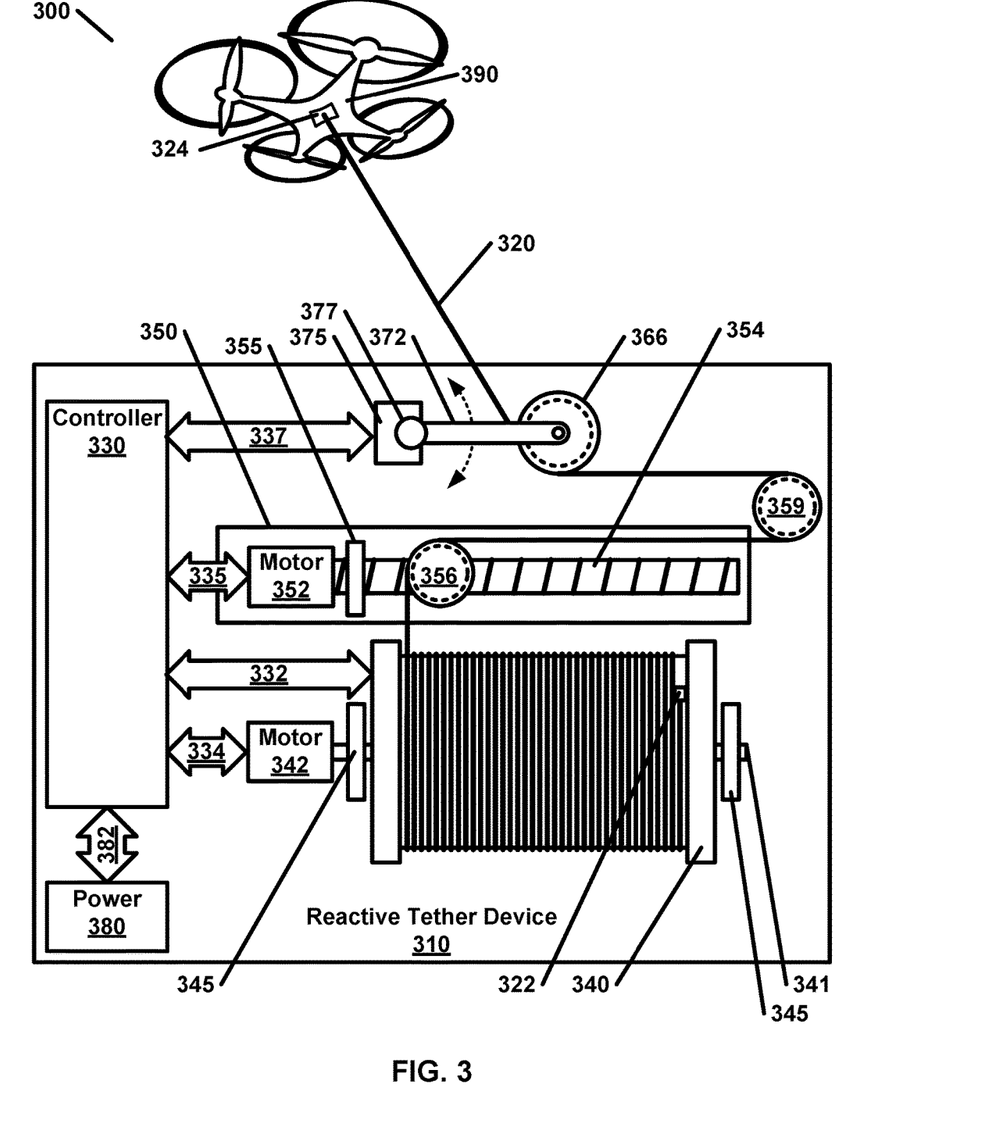
FIG. 3 is a diagram of a reactive spool as per an aspect of an embodiment of the present invention.

Example FIG. 3 is a diagram of a reactive spool 310 employed with a UAV 390 as per an aspect of another embodiment. A signal cable 320 may be wound on a drum 340 and fed through a cable drum feed 350, alignment pulley 359, and UAV feed pulley 366 to a UAV 390. The drum 340 may be rotatably mounted on a carriage 345. Drum actuator 342 may rotate the drum 340 via an axel 341 under control of a controller 330. The drum actuator 342 may comprise a stepper motor, a servo motor, a solenoid, a piston, a combination thereof, and/or the like. Communications between the controller 330 and the drum actuator may be communicated via communications conduit 334.

The signal cable 320 may transport signals and/or power to UAV 390. The signals and power may be transported to UAV 390 via, for example, conduits 382 and/or 332 to a drum connector 322 to signal cable 320 to UAV connector 324. Signals may comprise UAV control signals, data, actuator data, sensor data, combinations thereof, and/or the like. Power may be sourced by a power supply 380. The power may be conditioned at the power supply 380 and/or on UAV 390. For example, the power supply 380 may provide 48-volt power signal that may be regulated down to 8 or 24 volts on the UAV 390.

A cable drum feed 350 may employ a linear actuator to move a drum feed pulley 356 in place to allow signal cable 320 to wind/unwind on drum 340. The linear actuator may comprise, for example, a lead screw 354 rotated by a lead screw actuator 352 under control of controller 330. The lead screw may be supported by lead screw support member 355. The lead screw actuator may receive movement commands from and/or send movement data to controller 300 via conduit 335. Alignment pulley 359 may position the signal cable 320 between the drum feed pulley 356 and UAV feed pulley 366.

Figure 4A:
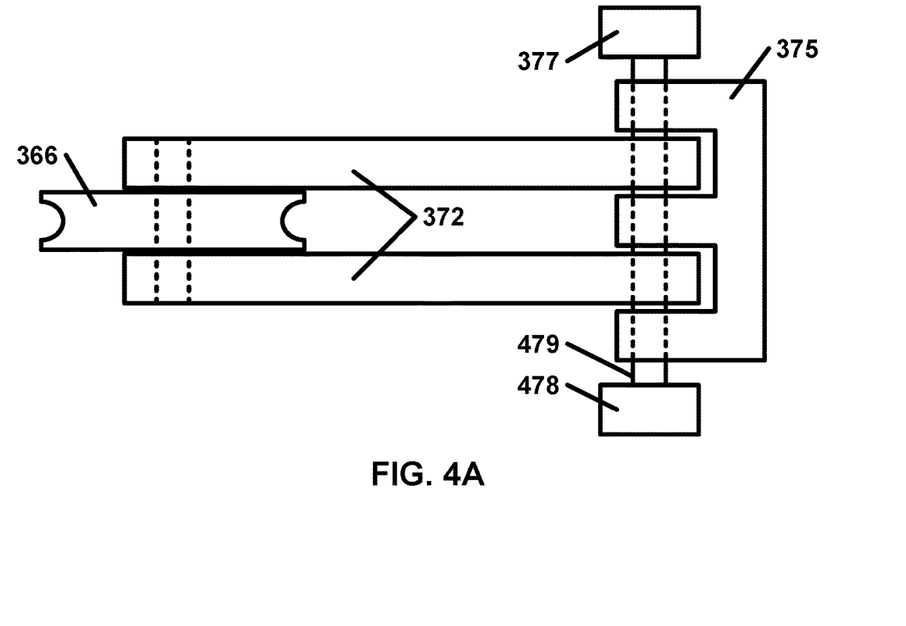
FIG. 4A and FIG. 4B illustrate a tension measurement assembly as per an aspect of an embodiment of the present invention.
Figure 4B:
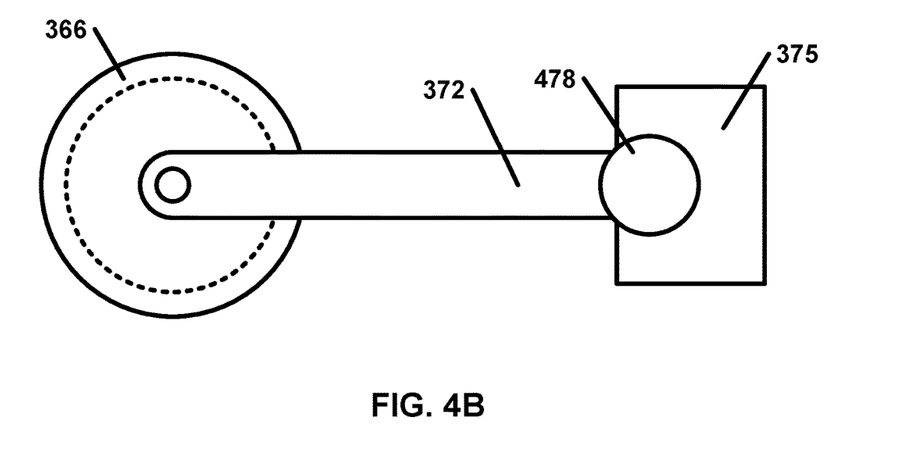

The UAV feed pulley 366 may be connected to and/or part of a tension sensor assembly. An example tension sensor assembly is illustrated in Example FIG. 4A and FIG. 4B. FIG. 4A is a top view of the example tension sensor assembly and FIG. 4B is a side view of the example tension sensor assembly. UAV feed pulley 366 may be connected to the first end rotatable arm(s) 372. The second end of end rotatable arm(s) 372 may be rotatably held in place by an axel 479 extending though block 375. The axel 479 may be attached and rotate with the rotatable arm(s) 372. One end of the axel 479 may be connected to an angle sensor 377 configured to measure the angle of the rotatable arm(s) 372. The other end of the axel 479 may be connected to a damper 478 configured to provide resistance in an amount that is less than the moment of the force exerted by the signal cable 320 on UAV feed pulley 470. The measurement from the angle sensor 377 may be reported to controller 330 via communications conduit 337. According to some embodiments, damper 478 may be an active damper configured to apply variable resistance based upon a command from controller 330 via conduit 337. According to some embodiments, damper 478 and angle sensor 377 may be integrated.

Figure 5:
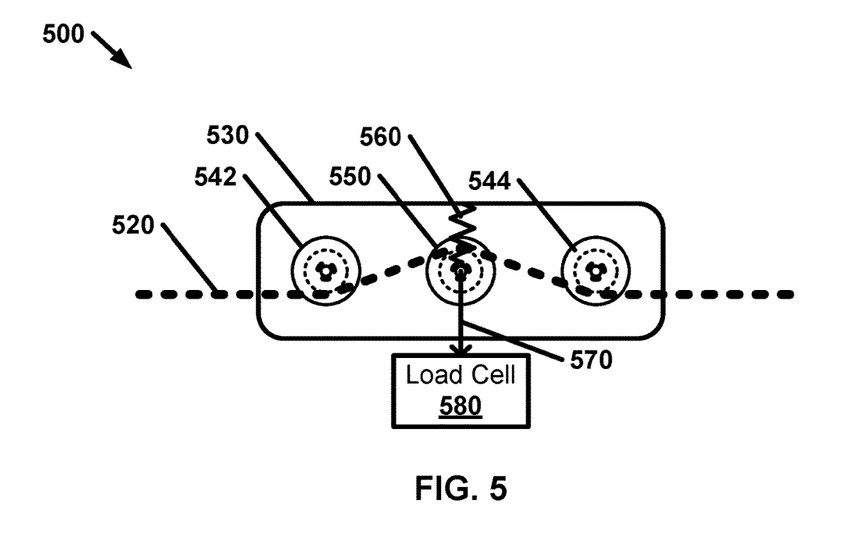
FIG. 5 is a diagram of a tension measurement mechanism as per an aspect of an embodiment of the present invention.

Example FIG. 5 is a diagram of yet another tension measurement assembly 500 that may be employed according to an aspect of an embodiment to measure the tension of a signal cable (e.g. 520). Two fixed pulleys 542 and 544 may be attached to a plate 530. A movable pulley 550, constrained to motions that are approximately perpendicular to the direction of the signal cable 520 may be mechanically linked (e.g. 570) to a load cell 580 in one direction and mechanically linked to a spring 560 in the other direction. The force exerted on the load cell 580 may be measured by the load cell 580 and employed as an approximation of the tension of signal cable 520.

Figure 6:
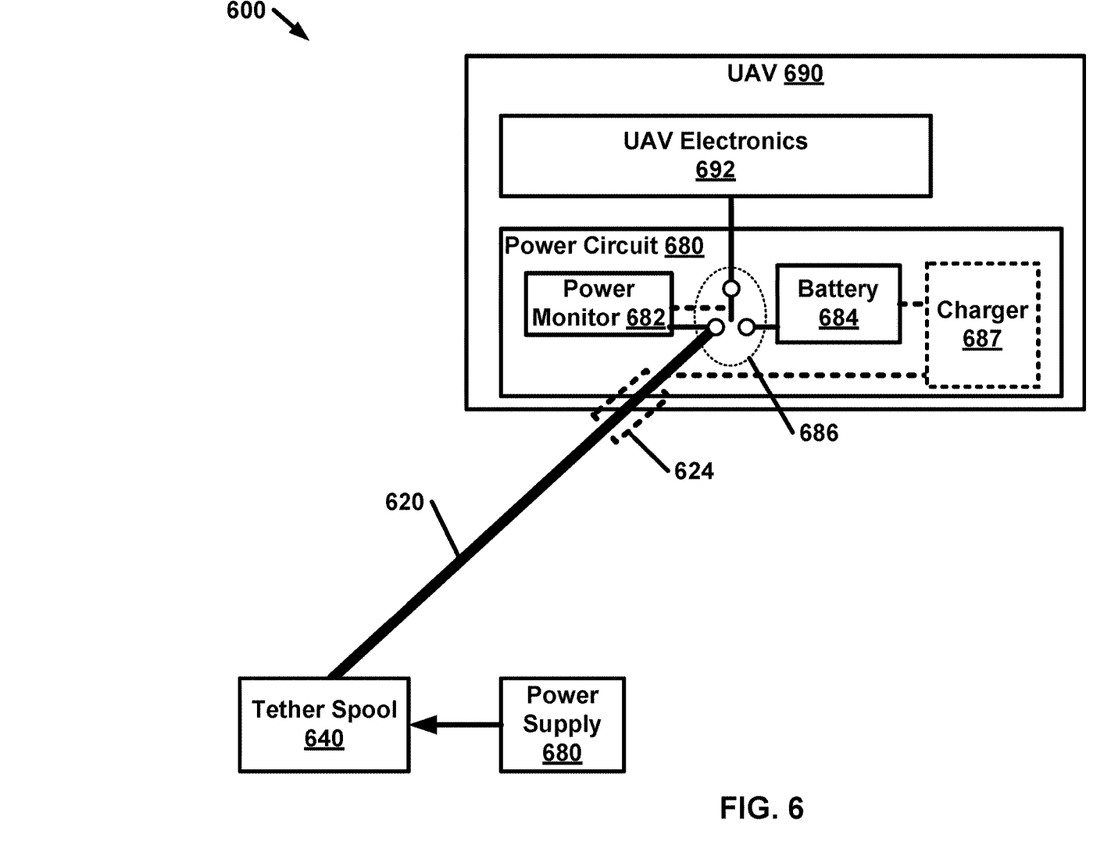
FIG. 6 is a diagram illustrating power transfer apparatus for an Unmanned Aerial Vehicle (UAV) as per an aspect of an embodiment of the present invention.

Example FIG. 6 is a diagram illustrating power transfer apparatus 600 for an UAV 690 as per an aspect of an embodiment. As illustrated in this example, a power supply 680 may provide power to UAV 690 via a signal cable 620 controlled by reactive tether spool 640. The signal cable 620 may connect to the UAV 690 via a UAV connector 624. Power supply 680 may be a remote power supply.

A power transfer circuit 680 may comprise a power monitor 682 a battery 684, a switch 686, and an optional charger 687. The switch may be controlled by power monitor 682. The power transfer circuit 680 may be configured to control the switch 686 to deliver power to the UAV electronics 692 from a battery 684 when power on the signal cable 620 falls below a threshold value. The power circuit 680 may also be configured to control switch 686 based upon commands received over the signal cable 620. Additionally, the power circuit 680 may comprise a battery charging circuit 687 electrically connected to: receive the power from the signal cable 620, and the battery 684. Additionally, the power may be conditioned (not shown) at the UAV 690. Conditioning may comprise changing the voltage of the power received from the signal cable 620.

When it is detected that power to a UAV is failing and/or power is running low, the system may be configured to issue a landing command to the UAV. The command may be issued by the power circuit and or by an external controller (e.g. controller 130, 330, etc.).

Figure 7:
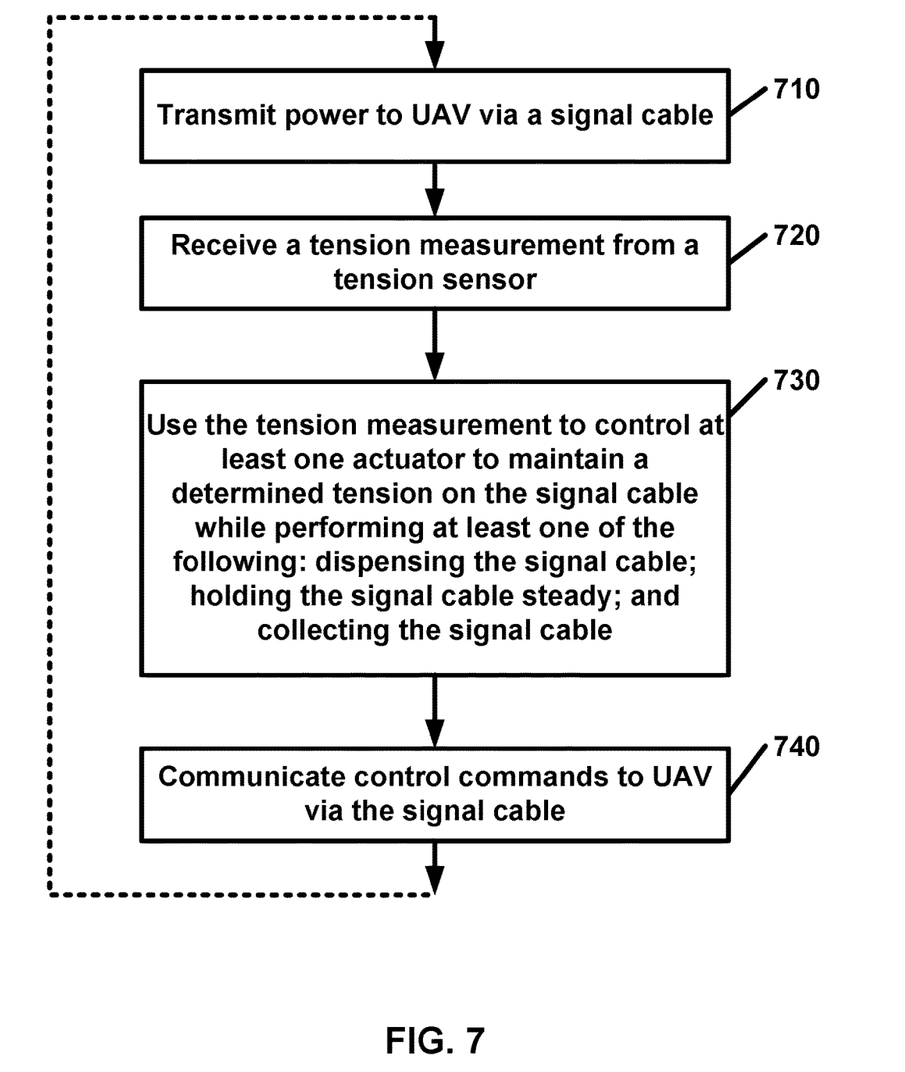
FIG. 7 is a flow diagram of a reactive spool process as per an aspect of an embodiment of the present invention.

Example FIG. 7 is a flow diagram of a reactive spool process as per an aspect of an embodiment of the present invention. At 710, power may be transmitted to a UAV via a signal cable. A tension measurement of the signal cable may be received from a tension sensor at 720. The tension measurement may be employed to control at least one actuator to maintain a determined tension on the signal cable at 730 while performing at least one of the following: dispensing the signal cable, holding the signal cable steady, collecting the signal cable, and/or the like. Control commands may be communicated to the UAV via the signal cable at 740. The steps in this process may be run iteratively, once and/or continuously. When run continuously or iteratively, the steps may, according to some of the embodiments, be changed.

Additional embodiments may comprise a base disposed to the carriage, a base angle sensor and a base actuator. The base angle sensor may provide the controller with directional data for the orientation of the base. The actuator may be employed to adjust the angle of the base. This may allow the tethering device to adjust the tether to follow a UAV.

Figure 8:
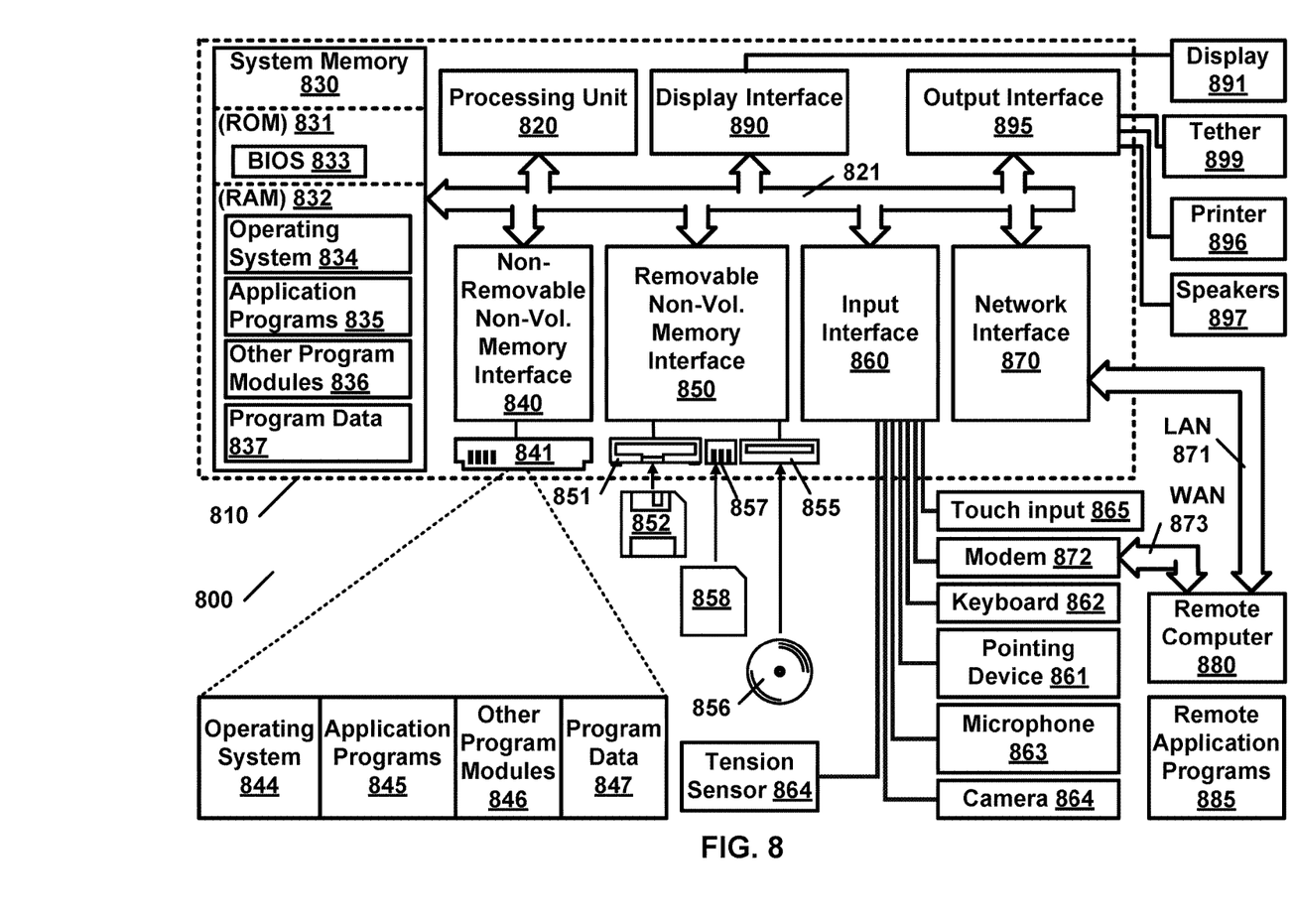
FIG. 8 illustrates an example of a computing system environment on which aspects of some embodiments may be implemented.

FIG. 8 illustrates an example of a suitable computing system environment 800 on which aspects of some embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other computing system environments and/or configurations. Examples of computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the context of computer-executable instructions, such as program modules, being executed by computing equipment. Generally, program modules include routines, programs, objects, components, data structures, etc. that perform particular tasks or implement particular abstract data types. Some embodiments are configured to be practiced in distributed computing environments where tasks are performed by remote processing devices that are linked through a communications network. In a distributed computing environment, program modules may be located in both local and remote computer storage media including memory storage devices.

With reference to FIG. 8, an example system for implementing some embodiments includes a computing device 810. Components of computing device 810 may include, but are not limited to, a processing unit 820, a system memory 830, and a system bus 821 that couples various system components including the system memory to the processing unit 820.

Computing device 810 may comprise a variety of computer readable media. Computer readable media can be any available media that can be accessed by computing device 810 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 830 comprises computer storage media in the form of volatile and/or nonvolatile memory such as ROM 831 and RAM 832. A basic input/output system 833 (BIOS), containing the basic routines that help to transfer information between elements within computing device 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computing device 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, a flash drive reader 857 that reads flash drive 858, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computing device 810. In FIG. 8, for example, hard disk drive 841 is illustrated as storing operating system 844, application programs 845, program data 847, and other program modules 846. Additionally, for example, non-volatile memory may include instructions to, for example, discover and configure IT device(s); the creation of device neutral user interface command(s); combinations thereof, and/or the like.

A user may enter commands and information into the computing device 810 through input devices such as a keyboard 862, a microphone 863, a camera 864, and a pointing device 861, such as a mouse, trackball or touch pad. Other devices may provide inputs such as, for example, tension sensor 864 and/or other sensors. These and other input devices are often connected to the processing unit 820 through an input interface 860 that is coupled to the system bus, but may be connected by other interface and bus structures, such as a parallel port, game port or a universal serial bus (USB). A display 891 may also connect to the system bus 821 via an interface, such as a display interface 890. Other devices, such as, for example, speakers 897, printer 896, and a reactive tether controls 899, and network switch(es) may be connected to the system via peripheral/output interface 895.

The computing device 810 may be operated in a networked environment using logical connections to one or more remote computers, such as a remote computer 880. The remote computer 880 may be a personal computer, a handheld device, a server, a router, a network PC, a peer device or other common network node, and typically includes many or all of the elements described above relative to the computing device 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computing device 810 may be connected to the LAN 871 through a network interface or adapter 870. When used in a WAN networking environment, the computing device 810 may typically include a modem 872 or other means for establishing communications over the WAN 873, such as the Internet. The modem 872, which may be internal or external, may be connected to the system bus 821 via the user input interface 860, or other appropriate mechanism. The modem 872 may be wired or wireless. Examples of wireless devices may comprise, but are limited to: Wi-Fi and Bluetooth. In a networked environment, program modules depicted relative to the computing device 810, or portions thereof, may be stored in the remote memory storage device. By way of example, and not limitation, FIG. 8 illustrates remote application programs 885 as residing on remote computer 880. It will be appreciated that the network connections shown are examples only and other means of establishing a communications link between the computers may be used. Additionally, for example, LAN 871 and WAN 873 may provide a network interface to communicate with other distributed infrastructure management device(s); with IT device(s); with users remotely accessing the Input Interface 860; combinations thereof, and/or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a reactive UAV tethering system. However, one skilled in the art will recognize that embodiments may be employed to other types of systems, for example, a submersible tethering system, a robotics tethering system, an inspection tethering system, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A device comprising:
   a carriage;
   a drum rotatably mounted on the carriage;
   a drum connector disposed on the drum;
   a signal cable configured to transport power and a control signal, the signal cable having:
      a first end of the signal cable configured to connect with the drum connector; and
      a UAV connector on a second end of the signal cable, the UAV connector configured to connect with a UAV;
   a drum actuator configured to rotate the drum;
   a cable drum feed configured to align the signal cable to the drum;
   a UAV feed configured to align the signal cable as it exits the device towards the UAV;
   a tension sensor configured to measure the tension of the signal cable; and
   a controller comprising:
      at least one processor;
      a tangible medium that is not a transitory propagating signal, the medium comprising instructions configured to cause the at least one processor to:
         receive a tension measurement from the tension sensor; and
         control the drum actuator to maintain a determined tension on the signal cable while performing at least one of:
            dispensing the signal cable;
            holding the signal cable steady; and
            collecting the signal cable.

2. The device according to claim 1, further comprising a power transfer circuit configured to deliver power to a UAV from a battery when power on the signal cable falls below a threshold value.

3. The device according to claim 2, wherein the power transfer circuit is connected to the UAV connector.

4. The device according to claim 1, further comprising a remote UAV power supply configured to provide the UAV power via the signal cable.

5. The device according to claim 1, further comprising a command circuit configured to deliver a landing command to a UAV when power on the signal cable falls below a threshold value.

6. The device according to claim 1, further comprising a command circuit configured to deliver a landing command to a UAV when power on the signal cable signal cable falls below a first threshold value and the power available on a UAV battery falls below a second threshold value.

7. The device according to claim 1, further comprising a slip ring structure configured to transport a signal between the drum connector and the controller.

8. The device according to claim 1, further comprising a slip ring structure configured to transport a signal between the drum connector and a communication device.

9. The device according to claim 1, further comprises a motor controller and wherein:
   the drum actuator is a motor; and
   the instructions are further configured to cause the at least one processor to control the motor via the motor controller.

10. The device according to claim 9, wherein the drum motor comprises at least one of:
   a stepper motor;
   a servo motor;
   a solenoid; and
   a switch.

11. The device according to claim 1, wherein the cable drum feed comprises
  a. a linear actuator configured to be controlled by the controller; and
  b. a tether spooling pulley connected to a linear actuator.

12. The device according to claim 11, wherein the linear actuator comprises a lead screw rotatable by a lead screw actuator.

13. The device according to claim 12, wherein the lead screw actuator comprises at least one of:
  a stepper motor;
  a servo motor;
  a solenoid; and
  a switch.

14. The device according to claim 1, further comprising an alignment pulley configured to align the signal cable between the drum and the UAV feed.

15. The device according to claim 1, wherein the UAV feed comprises a pulley.

16. The device according to claim 15, the UAV feed comprises a damper.

17. The device according to claim 1, wherein the tension sensor comprises at least one of:
  a load cell;
  a strain gage transducer;
  a tension sensing roller;
  a piezo electric crystal; and
  an angle sensor.

18. The device according to claim 1, wherein the tension sensor is disposed between the cable drum feed and the UAV feed.

19. The device according to claim 1, wherein the signal cable further comprises a cable component with a breaking strength in excess of 10 pounds.

20. The device according to claim 1, wherein the signal cable comprises at least one of:
  an electrical cable;
  a optical cable; and
  a coaxial cable.

* * * * *